(12) United States Patent
Zhou et al.

(10) Patent No.: US 9,458,703 B2
(45) Date of Patent: Oct. 4, 2016

(54) COMPRESSIBLE CARBONACEOUS PARTICULATE MATERIAL AND METHOD OF MAKING SAME

(71) Applicants: Changjun Zhou, Naperville, IL (US); Richard D. Nelson, Littleton, CO (US)

(72) Inventors: Changjun Zhou, Naperville, IL (US); Richard D. Nelson, Littleton, CO (US)

(73) Assignee: Superior Graphite Co., Chicago, IL (US)

(*) Notice: Subject to any disclaimer, the term of this patent is extended or adjusted under 35 U.S.C. 154(b) by 144 days.

(21) Appl. No.: 14/140,730

(22) Filed: Dec. 26, 2013

(65) Prior Publication Data
US 2015/0184495 A1 Jul. 2, 2015

(51) Int. Cl.
| | | |
|---|---|---|
| C01B 31/00 | (2006.01) | |
| E21B 43/12 | (2006.01) | |
| C01B 31/08 | (2006.01) | |
| C01B 31/02 | (2006.01) | |
| C09K 8/03 | (2006.01) | |
| C09K 8/487 | (2006.01) | |
| C09K 8/516 | (2006.01) | |
| C04B 28/02 | (2006.01) | |
| C04B 38/00 | (2006.01) | |

(52) U.S. Cl.
CPC .............. *E21B 43/12* (2013.01); *C01B 31/00* (2013.01); *C01B 31/02* (2013.01); *C01B 31/08* (2013.01); *C04B 28/02* (2013.01); *C04B 38/009* (2013.01); *C09K 8/032* (2013.01); *C09K 8/487* (2013.01); *C09K 8/516* (2013.01)

(58) Field of Classification Search
CPC ................................ C01B 31/00; E21B 43/12
See application file for complete search history.

(56) References Cited

U.S. PATENT DOCUMENTS

| | | | |
|---|---|---|---|
| 3,444,276 A | 5/1969 | Olstowski et al. | |
| 3,567,808 A | 3/1971 | Smith | |
| 3,684,446 A | 8/1972 | Markel | |
| 4,160,813 A | 7/1979 | Markel et al. | |
| 4,190,637 A * | 2/1980 | Kennedy ............... | C04B 35/521 264/29.5 |
| 5,017,358 A | 5/1991 | Yamada et al. | |
| 5,190,696 A | 3/1993 | Fujii et al. | |
| 5,614,459 A * | 3/1997 | Mondragon ........... | C01B 31/125 502/180 |
| 5,826,669 A | 10/1998 | Zaleski et al. | |
| 7,067,051 B2 * | 6/2006 | Fujino ..................... | C01B 31/12 208/39 |
| 7,264,053 B2 | 9/2007 | Vargo, Jr. et al. | |
| 7,963,333 B2 | 6/2011 | Hermes et al. | |
| 8,808,498 B2 | 8/2014 | Tikka | |
| 2006/0213663 A1 | 9/2006 | Vargo et al. | |
| 2009/0075847 A1 | 3/2009 | Wawrzos et al. | |

FOREIGN PATENT DOCUMENTS

JP 4-342408 11/1992

OTHER PUBLICATIONS

Declaration of Stephen B. Heller Relative to Third-Party Activities Occurring Prior to Dec. 26, 2012, signed Apr. 7, 2014.
From the International Searching Authority, PCT Notification of Transmittal of the International Search Report and the Written Opinion of the International Searching Authority, or the Declaration, Date of Mailing: Mar. 3, 2015, International Application No. PCT/US2014/062109, Applicant: Superior Graphite Co., 17 pages.
Sharath Savari et al., SPE 153154, Resilient Lost Circulation Material (LCM): A Significant Factor in Effective Wellbore Strengthening, Jun. 20-21, 2012 presentation at the SPE Deepwater Drilling and Completions Conference held in Galveston, Texas, 7 pages.
Giin-Fa Fuh et al., SPE 24599, A New Approach to Preventing Lost Circulation While Drilling, Oct. 4-7, 1992 presentation at the 67th Annual Technical Conference and Exhibition of the Society of Petroleum Engineerings held in Washington, DC, 14 pages.
J.J. Kipling et al., The Pore Structure and Surface Area of High-Temperature Polymer Carbons, Carbon, 1964, vol. 1, pp. 321-328, 8 pages.
Z. Weishauptova, A Change in the Porous Structure of Coke Between 1540° C. and 2880° C. Caron, vol. 30, No. 7, pp. 1055-1062, May 13, 1992, 8 pages.
Donald L. Whitfill et al., SPE 84319, All Lost-Circulation Materials and Systems Are Not Created Equal, Oct. 5-8, 2013 presentation at the SPE Annual Technical Conference and Exhibition held in Denver, Colorado, 9 pages.

* cited by examiner

*Primary Examiner* — Stuart Hendrickson
(74) *Attorney, Agent, or Firm* — Cook Alex Ltd.

(57) ABSTRACT

A carbonaceous particulate material is provided that is characterized by having a reversible volumetric expansion/contraction in fluid media ("$V_R$") of greater than or equal to ($\geq$)3% between 4,000 psi and 10,000 psi. The porous carbonaceous particulate material of the present disclosure is also characterized by having a true density, ("$P_T$"), of 1.2 g/cc$\leq P_T \leq$2.0 g/cc, when milled to −200 mesh and has a $d_{50}$ particle size distribution of about 15 μm. This is the consequence of the instant material exhibiting a high level of closed porosity with very small pores, in contrast with prior art materials that would have a wider range pore sizes for the closed pores.

8 Claims, 8 Drawing Sheets

Fig 3a. 1st intrusion/extrusion

Fig 3b. 2nd intrusion/extrusion

Fig 3c. 10th intrusion/extrusion cycle

Fig 4a. 1st intrusion/extrusion

Fig 4b. 2nd intrusion/extrusion

FIG. 5

Fig 6. Percent Volumetric Change of 9701 Measured in 3 Different Liquids

COMPRESSIBLE CARBONACEOUS PARTICULATE MATERIAL AND METHOD OF MAKING SAME

The present disclosure relates to a compressible carbonaceous material and, more particularly to a carbonaceous material that exhibits highly repeatable degree of reversible volumetric contraction and expansion when subjected to extremely high pressure.

BACKGROUND

In drilling and operating wells for oil and gas production, fluids and fluid additives are used for numerous different purposes. For example, during the initial drilling, fluids may be used for lubrication of the drilling string and drilling fluid additives may serve to increase lubricity or serve as "loss circulation materials" that serve to plug fissures in the geologic formation, thus inhibiting the loss of the drilling fluid into the formation. In such circumstances, it is known to add resilient materials to the drilling fluid. See, e.g., U.S. Pat. No. 5,826,669, which discloses a method of preventing or controlling the loss of well drilling fluid into the pores and fractures of subterranean rock formations by the addition of resilient graphitic carbon particles.

During well completion, necessary to bring the well into production once the drilling operations have been completed, the downhole casing string is assembled, and the annulus between the casing and the borehole is sealed with cement ("primary cementing"). After completion of the primary cementing operations, production of oil or gas may commence. As oil and gas flow through the wellbore, heat passes through the casing into the annular space, resulting in the expansion of any fluids therein. This may result in annular pressure build-up ("APB"), a potentially dangerous condition that could result in the rupture of the casing wall or production tubing. Techniques for mitigating APB include the introduction of resilient or elastic particles into the annulus that collapse when subjected to the high pressures of APB, thus increasing the available volume of the annulus and decreasing the pressure. See, e.g., U.S. Pat. No. 8,080,498, which discloses the use of elastic hollow particles that buckle at or near a defined pressure and rebound towards their original shape as the pressure decreases for mitigating APB.

By way of the present disclosure a compressible carbonaceous particulate material is provided that has highly repeatable contraction and expansion characteristics ("reversible volumetric contraction and expansion") when subjected to extremely high temperatures and pressures, such that the material reversibly expands and contracts by about 20% when subjected to pressures of up to 10,000 psi. This is believed to be due to the abundant fine closed porosity within the resilient structure of the particulate material, as evidenced by the fact that the milling of the material to a desired particle size distribution has a minimal effect on the true density of the milled material versus that of the starting material. Accordingly, the material can be added to increase the compressibility of fluid and solid mixtures, and may be suitable for adding to drilling fluids as, e.g., an LCM, wellbore service fluids to, e.g., mitigate APB, and cement slurries, for primary cementing or otherwise.

SUMMARY OF THE DISCLOSURE

The present subject matter disclosed herein has a number of aspects which may be used in various combinations, and the disclosure of one or more specific characteristics is for purposes of disclosure and description and not limitation. This summary only highlights a few of the aspects of this subject matter. Additional aspects are disclosed in the drawings and more detailed description that follows.

In one aspect of the disclosure, a porous carbonaceous particulate material is provided that is characterized by having a reversible volumetric expansion/contraction in fluid media ("$V_R$") of greater than or equal to ($\geq$)3% between 4,000 psi (27.6 MPa) and 10,000 psi (68.9 MPa). In another aspect, the quantitative value for $V_R$ is comparable regardless of whether the liquid used for the fluid media is water, mercury or diesel fuel.

In another aspect, the porous carbonaceous particulate material of the present disclosure is further characterized by having a true density, ("$P_T$"), of 1.2 g/cc$\leq P_T \leq$2.0 g/cc when milled to −200 mesh (75 μm) and has a $d_{50}$ particle size distribution of about 15 μm.

In another aspect, the porous carbonaceous particulate material of the present disclosure may be further characterized by having a $d_{50}$ mean particle size of from 5 um to 8 mesh (2.38 mm).

In a further aspect, the porous carbonaceous material is further characterized by having a degree of graphitization of less than or equal to ($\leq$)60%.

In further aspect, the porous carbonaceous particulate material is further characterized by having a sulfur content that may be as high as 8%, but is preferably from 0.05% to 1.2%.

DETAILED DESCRIPTION

A more detailed description of a carbonaceous particulate material in accordance with the present application is set forth below. It should be understood that description below of specific characteristics and methods is intended to be exemplary, and not exhaustive of all possible variations or applications. Thus, the scope of the disclosure is not intended to be limiting, and should be understood to encompass variations or embodiments that would occur to persons of ordinary skill.

The carbonaceous particulate material of the present disclosure is a petroleum coke that is heat treated. The starting material is commercially known as "Calcined Petroleum Coke-Medium High Sulfur," the typical characteristics of which are set forth in Table 1. However, in some circumstances the maximum sulfur content of the starting material may be as high as 8%.

TABLE 1

| | |
|---|---|
| Ash, % | <0.5 |
| Moisture, % | <0.5 |
| Sulfur, % | 3.00 max |
| Resistivity, ohm · in | 0.0500 (max) |
| True density, g/cc | 2.02 (min) |
| Volatile, % | <0.5 |

The starting material is heat-treated in a fluidized bed furnace, such as that shown and described in U.S. Pat. No. 4,160,813, incorporated herein by reference. This patent discloses a method for heat treating carbonaceous material in an electro-thermally heated fluidized bed. In practicing this method, the following parameters, set forth in Table 2, resulted in the production of a carbonaceous particulate material in accordance with the present disclosure when the starting material has the characteristics set forth in Table 1.

TABLE 2

| Retention time in the fluidized bed | Adjusted to obtain desired sulfur content |
|---|---|
| Operating temperature of the fluidized bed | 1540-1670° C. |
| Sulfur content of starting material | 2.65%-2.91% |
| Sulfur content of treated material | 0.8%-1.2% |

The resultant material comprises a carbonaceous particulate material that is characterized by having a reversible volumetric expansion/contraction in fluid media ("$V_R$") (as determined in accordance with the equipment and method described in greater detail below) of greater than or equal to ($\geq$)3% between 4,000 psi (27.6 MPa) and 10,000 psi (68.9 MPa). This means that the resultant material can be repeatedly subjected to pressures between 4,000 psi and 10,000 psi and "rebound" to its original volume to a much greater degree than other known carbonaceous materials. This is believed to be the consequence of the instant material exhibiting a high level of closed porosity with very small pores, in contrast with prior art materials that would have a wider range pore sizes for the closed pores. The material also exhibited a degree of graphitization of less than or equal to ($\leq$)60%, as determined from X-ray diffraction analysis.

Figure 1A:
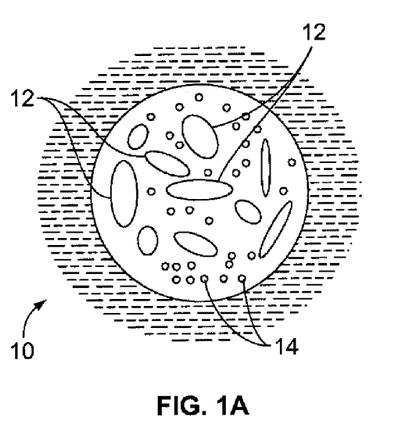
FIGS. 1a and 1b are schematic representations of a carbonaceous particle having a typical closed porosity, with small and large pores, under normal pressure (FIG. 1a) and under high pressure (FIG. 1b).
Figure 1B:
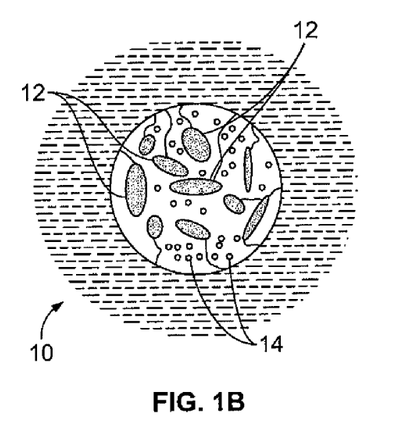
Figure 2A:
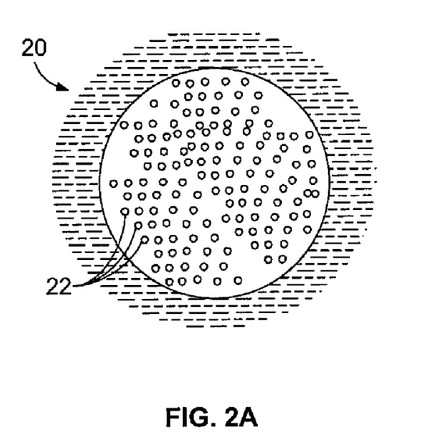
FIGS. 2a and 2b are schematic representations of a carbonaceous particle according to the present disclosure having generally uniformly small or fine closed porosity under normal pressure (FIG. 2a) and under high pressure (FIG. 2b).
Figure 2B:
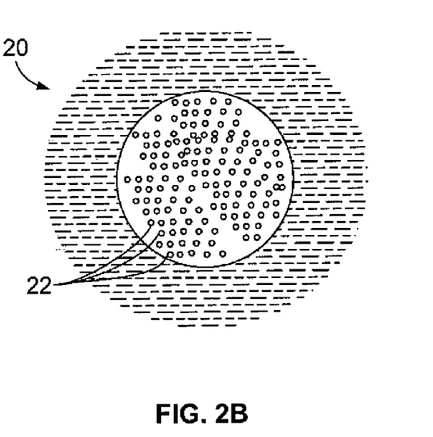

The difference is illustrated in comparing FIG. 1a to FIG. 2a. With reference to FIG. 1a, a typical carbonaceous particle 10 is schematically illustrated. The particle 10 has a combination of large-sized pores 12 and smaller pores 14. In contrast, the carbonaceous particle 20 illustrated in FIG. 2a has only smaller-sized pores 22. The difference this makes is shown with reference to FIGS. 1b and 2b, where the particles 10 and 20 are shown suspended in a fluid that is being subjected to a high pressure. When the particle 10 is subjected to high pressure, fissures 16 form in the surface of the particle 10 connecting the large pores 12 to the surface and that permit fluid to flow into the large pores. However, upon release of the pressure, when the particle 10 will tend to rebound back towards its uncompressed state, the fluid residing in the large pores 12 is not expelled. Instead, more fluid is likely to be drawn into the large pores as they expand. Once the large pores are filled with fluid, their ability to subsequently be compressed is reduced. In contrast, and as illustrated in FIG. 2b, the integrity of the smaller-sized pores 22 in particle 20 is maintained when subjected to high pressure, such that there is no significant ingress of fluid. Thus, upon release of the pressure, the particle 20 is likely to rebound more fully toward its uncompressed state, as shown in FIG. 2a, and then compress back to its FIG. 2b size upon subsequent applications of pressure.

Figure 3A:
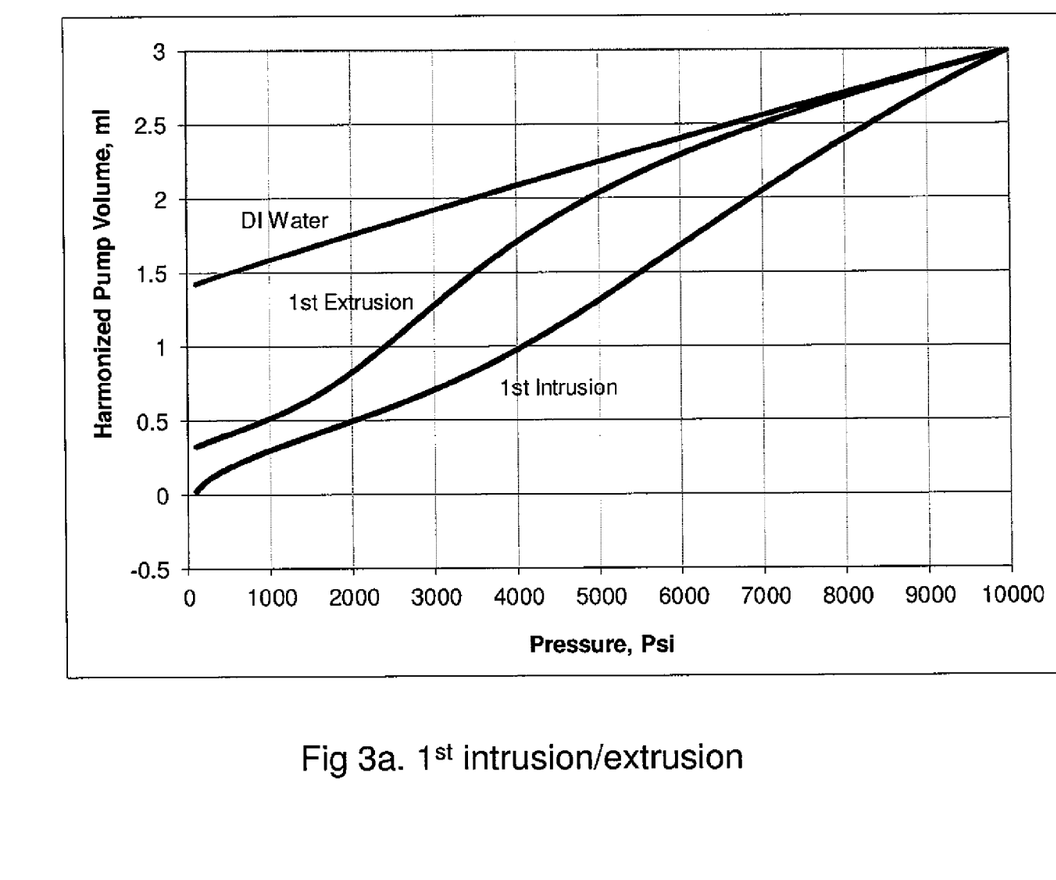
FIGS. 3a, 3b, 3c and 4a, 4b are graphs showing the results of a fluid intrusion/extrusion test of a carbonaceous material in accordance with the present disclosure (FIGS. 3a, 3b and 3c) for a first, second and tenth fluid intrusion/extrusion cycle and a prior art material (FIGS. 4a and 4b) for a first and second fluid intrusion/extrusion cycle.
Figure 3B:
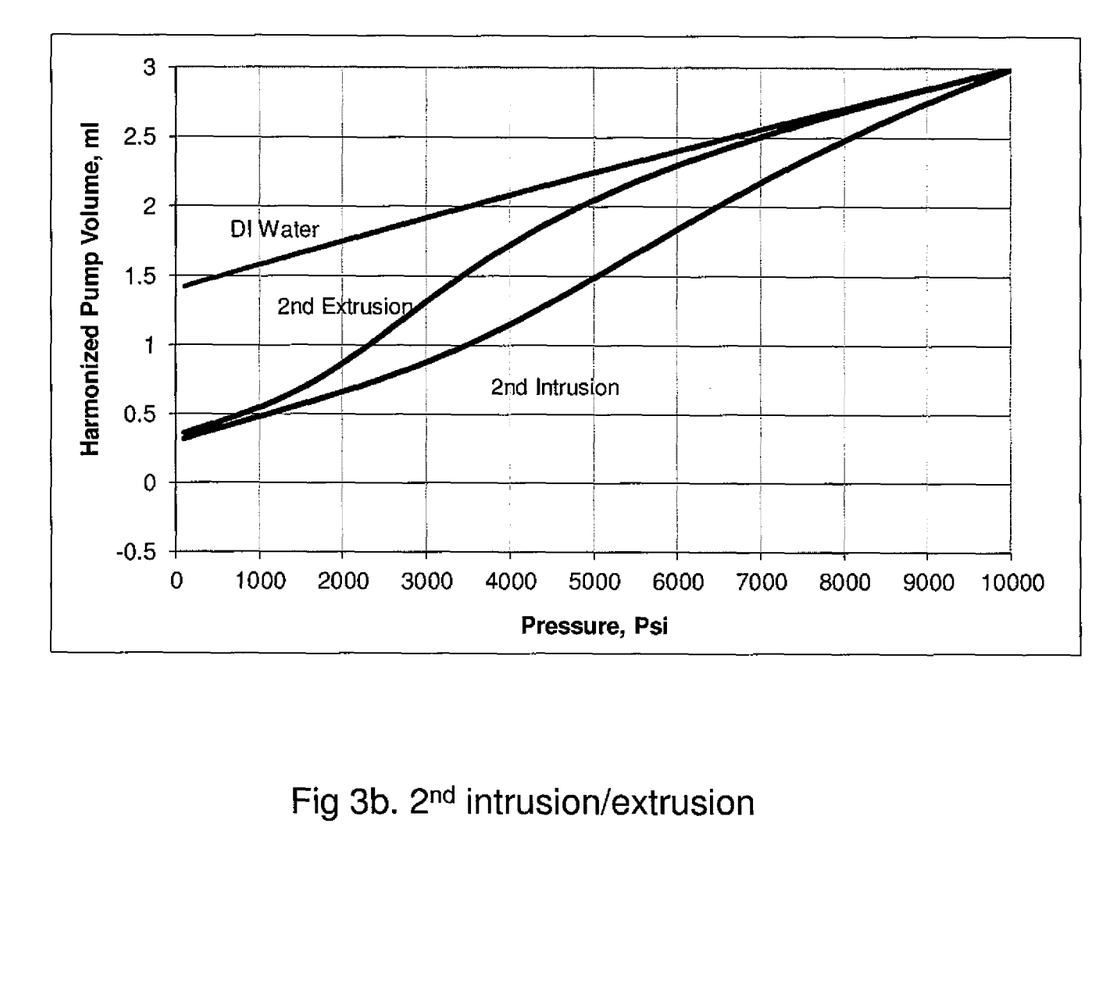
Figure 3C:
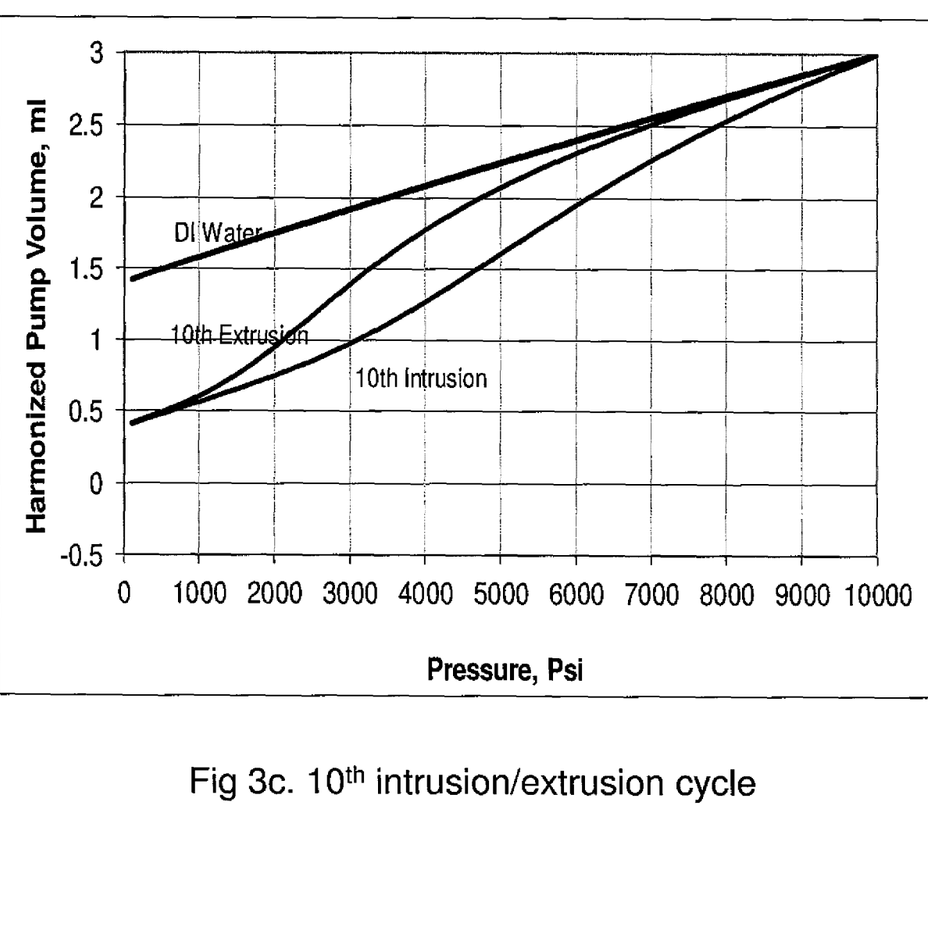
Figure 4A:
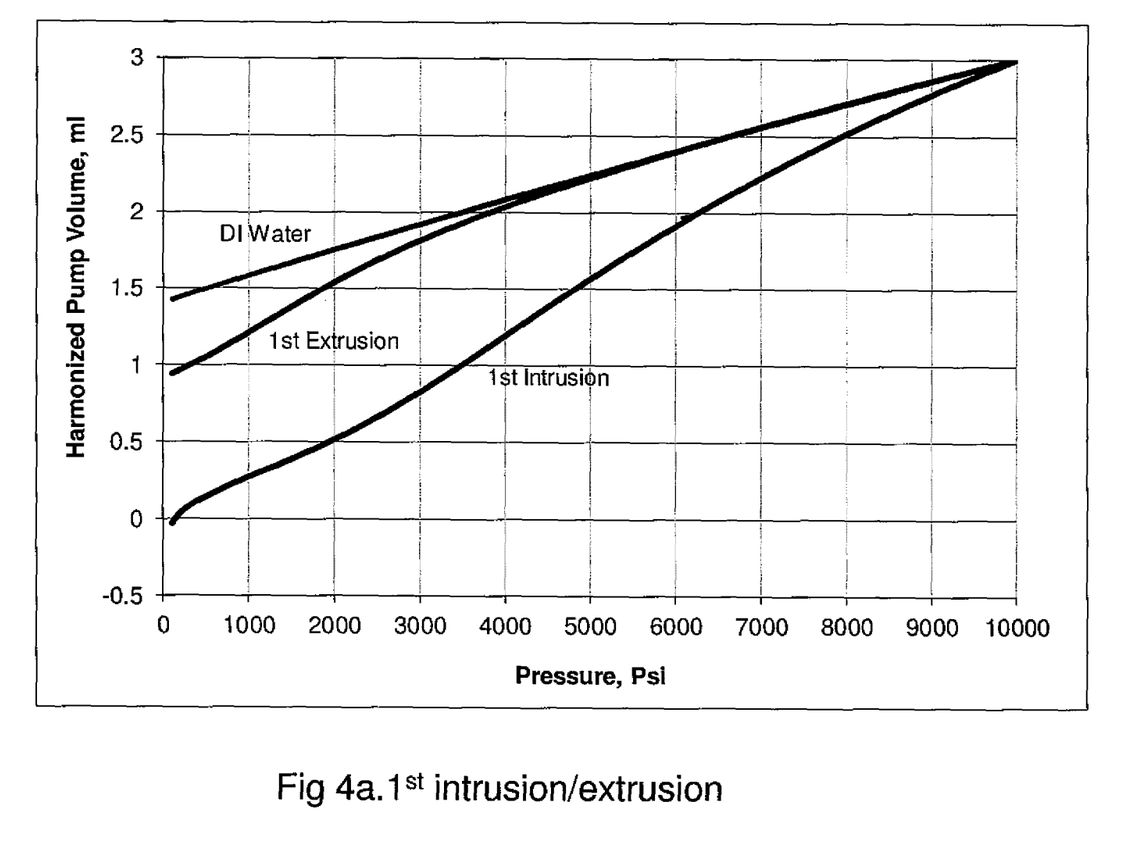
Figure 4B:
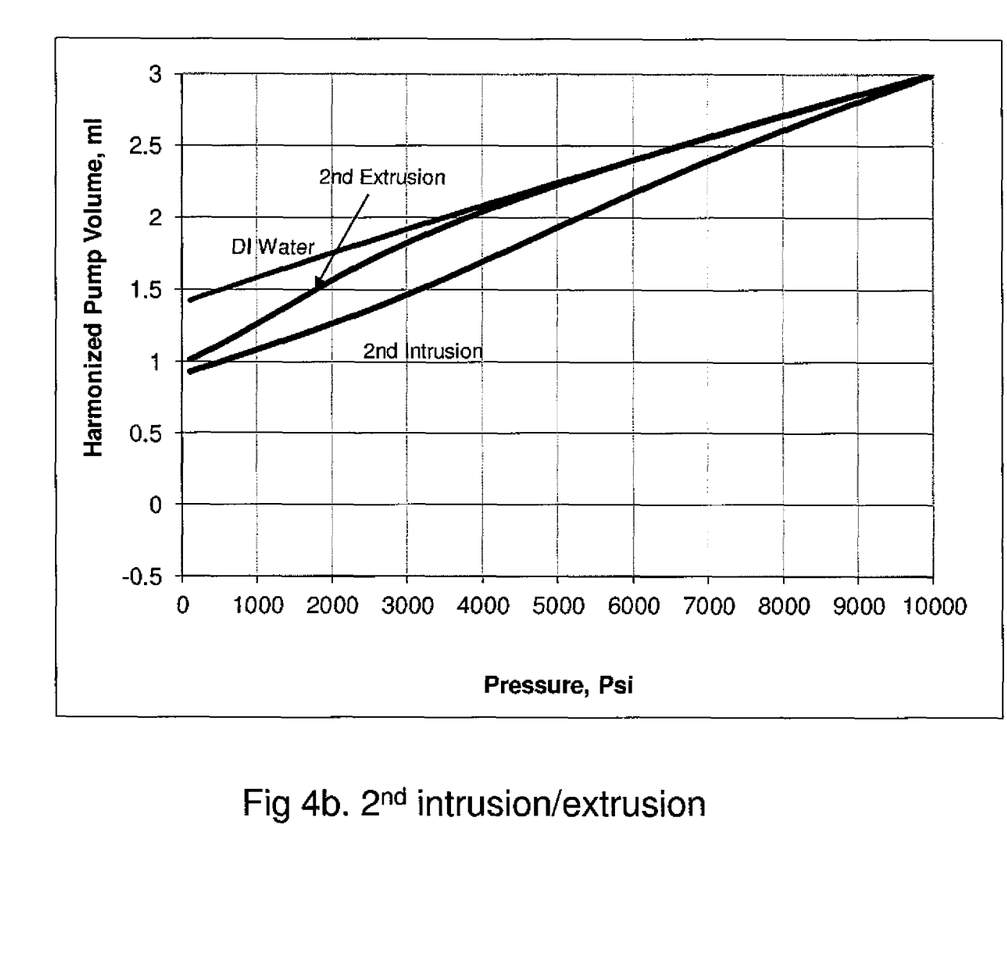

The characteristic of fine closed porosity for the material of the present disclosure in contrast to the prior art material is supported by a comparison of the results of fluid intrusion/extrusion tests for the two materials, as illustrated in FIGS. 3a, 3b(for the material of the present disclosure) and 4a, 4b (for the prior art material). FIGS. 3a and 4a are for a first fluid intrusion/extrusion cycle, while FIGS. 3b and 4b are for a second fluid intrusion/extrusion cycle. It should be noted that the plots of FIGS. 3a and 3b are substantially similar, while the plot of FIG. 4b shows a significantly reduced fluid intrusion volume for the second cycle in comparison to the first cycle shown in FIG. 4a; suggesting the presence of small closed pores that remain intact in the present material and larger pores that fill with fluid in the prior art material. Also of note is the similarity between the plots of FIGS. 3a and 3b for the first and second intrusion/extrusion cycles and that of FIG. 3c for the tenth intrusion/extrusion cycle, which indicates that the material of the present disclosure can be repeatedly subjected to extremely high fluid pressures (such as those experienced in a downhole) without significant degradation of its compression and rebound characteristics.

The characteristic of fine closed porosity for the material of the present disclosure, in contrast to the presence of larger and/or open pores in the prior art materials, is also indicated by the relatively smaller change in the true density of the material as it is milled to smaller sizes. Consequently, the porous carbonaceous particulate material of the present disclosure may be characterized by its having a true density, ("$P_T$"), of 1.2 g/cc$\leq P_T \leq$2.0 g/cc, when milled to −200 mesh and to a $d_{50}$ particle size distribution of about 15 μm. (Particle size distribution for materials coarser than 200 mesh (75 μm) may be determined by sieve analysis, while laser analysis is used for finer grades. In sieve analysis, the material is simply vibrated through a stack of sieves and the weight fractions collected on sieves. Laser particle size analysis may be determined by use of a laser diffraction particle size analyzer, such as the Microtrac S3500, available from Microtrac, Inc. of Montgomeryville, Pa.)

"True density" is determined by gas displacement pycnometry. Gas displacement pycnometry systems are available from, e.g., Micromeritics Instrument Corporation of Norcross, Ga. Gas pycnometry uses a gas displacement method to measure volume accurately. Thus, a pycnometer actually measures true volume, and not density. True volume is total volume minus volume accessible to the gas (typically helium or nitrogen). Density is calculated by dividing sample weight with true volume. The sample is sealed in the instrument compartment of known volume, the appropriate gas is admitted, and then expanded into another precision internal volume. The pressure before and after expansion is measured and used to compute the sample volume. Dividing the sample volume into the sample weight gives the gas displacement density.

Because the milling of the present material does not create access to large pores, the internal volume of the material that is accessible to the gas changes little. In the prior art material, milling can open up the larger pores to the surface, so that the internal volume accessible to the gas can change significantly. Thus, the porous carbonaceous particulate material of the present disclosure is characterized by having a true density, ("$P_T$"), of 1.2 g/cc≤$P_T$≤2.0 g/cc, when milled to −200 mesh and has a $d_{50}$ particle size distribution of about 15 μm. In a specific example, the present material, unmilled, had a $d_{50}$ particle size of 437 μm and a true density, $P_T$, of 1.49 g/cc, while the milled material had a $d_{50}$ particle size of 15.8 μm and a true density, $P_T$, of 1.67 g/cc.

The porous carbonaceous particulate material of the present disclosure is also characterized by having a reversible volumetric expansion/contraction in fluid media ("$V_R$") of greater than or equal to (>/=) 3% between 4,000 psi and 10,000 psi. The reversible volumetric expansion/contraction is determined using a test apparatus such as that schematically disclosed in FIG. 5. In general, the test apparatus 30 comprises a high pressure test cell or cylinder 32 with a floating or sliding piston 34 received therein. Such a test cylinder may be obtained from High Pressure Equipment Company of Erie, Pa. On one side of the piston 34 is a slurry 36 containing the material to be tested. The other side of the piston 34 is subjected to pressurized fluid to compress the slurry, the change in volume of the cylinder on the slurry side of the piston corresponding to the volumetric contraction. Pressurized fluid is provided by a precision pump 38, such as the Quizix pumps, available from Chandler Engineering of Broken Arrow, Okla. A pump having a 20 k psi pressure rating has been found satisfactory. The pump 38 is connected by tubing 40 to a reservoir 42 that contains the fluid for pressurizing the cylinder and by tubing 44 connecting the pump 38 to the test cylinder 32. The test cylinder also includes a valve 46, such as a needle valve, for bleeding any air in the cylinder on the slurry-side of the piston.

Figure 5:
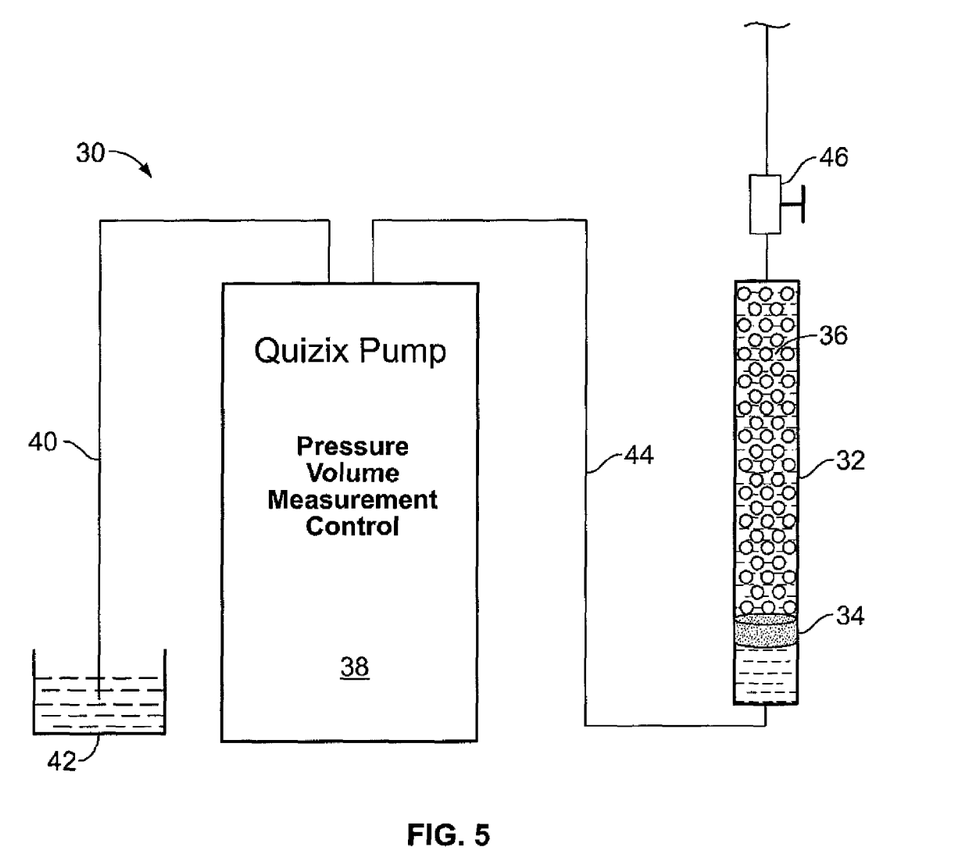
FIG. 5 is a schematic diagram of a testing assembly used for determining the reversible volumetric expansion and contraction in a liquid media of the particulate material of the present disclosure.

The reversible volumetric expansion/contraction is determined as follows:

1) The test assembly is primed with fluid, making sure that no gas bubbles exist below the floating piston.
2) The sample of the material to be tested is added to the high pressure cell. A surfactant may be required to be added to the material to make it dispersible in the fluid used to constitute the slurry, especially if the fluid is water, and to facilitate the removal of gas from the system. In practice, 0.2 ml (~7 drop) of 2% solution of Triton X-100 surfactant was added. Water is added until all the sample material is immersed. Trapped air is removed by stirring the mixture with a spatula. More water is added to fill the whole cell.
3) The high pressure cell is assembled by putting the cap equipped with a needle valve back on the top of the cell. Water is injected with the pump slowly (1 ml/minute) until water comes out from the needle valve.
4) The high pressure cell is sealed with the needle valve.
5) Water is injected into the high pressure cell to 100 psi, with the pump in constant pressure delivery mode.
6) Water is then injected to pressurize the cell to 4,000 psi, with the pump in constant pressure delivery mode, 1,000 psi per minute
7) Water is injected into ("intrusion") and retracted from ("extrusion") the high pressure cell so that pressure in the cell increases or decreases linearly with time (1,000 psi/minute) between 4,000 psi and 10,000 psi, using the constant pressure delivery/receive mode. The cycle is repeated once.

Reversible volume contraction/expansion is then calculated as follows:

$$v_{r,c} = V_{2i,4000} - V_{2i,10000}$$

$$v_c = m_c/\rho_c$$

$$\chi = \frac{v_c}{v_{cell} + v_{dead}}$$

$$\text{Reversible Volume Shrinkage \%} = \frac{v_{r,c} - v_{r,w} \times (1-\chi)}{v_c} \times 100\%$$

$V_{2i,4000}$ is the liquid volume reading from pump at the start of $2^{nd}$ intrusion at 4,000 psi.

$V_{2i,10000}$ is the liquid volume reading from pump at the end of $2^{nd}$ intrusion at 10,000 psi.

$v_{r,c}$ is the total volume change observed in experiment.

$v_c$ is the true volume of carbon sample.

$m_c$ is sample weight.

$\rho_c$ is true density as measured by gas pycnometry using helium.

x is volumetric fraction of carbon in test volume ($v_{cell} + v_{dead}$).

$V_{dead}$ includes volume of tubing, pump cylinder, valve volume, etc.

The test procedure is designed to have cylinder almost full at the beginning of test cycle/low pressure, and almost empty at end of test cycle/high pressure. For easy calculation, a constant volume, or half of cylinder volume may be used to approximate water volume in cylinder for the whole duration of experiment. Error generated by such an approximation is rather small, as cylinder volume is only about 6% of test volume. $v_{r,w}$ is the equivalent of $v_{r,c}$ volume change obtained in control experiment when no sample is added to the system. Based on the foregoing, the reversible volumetric shrinkage of a prior art material was determined to be 2.5%, while that of a material according to the present disclosure was 7.1%, and water was 1.8%.

Figure 6:
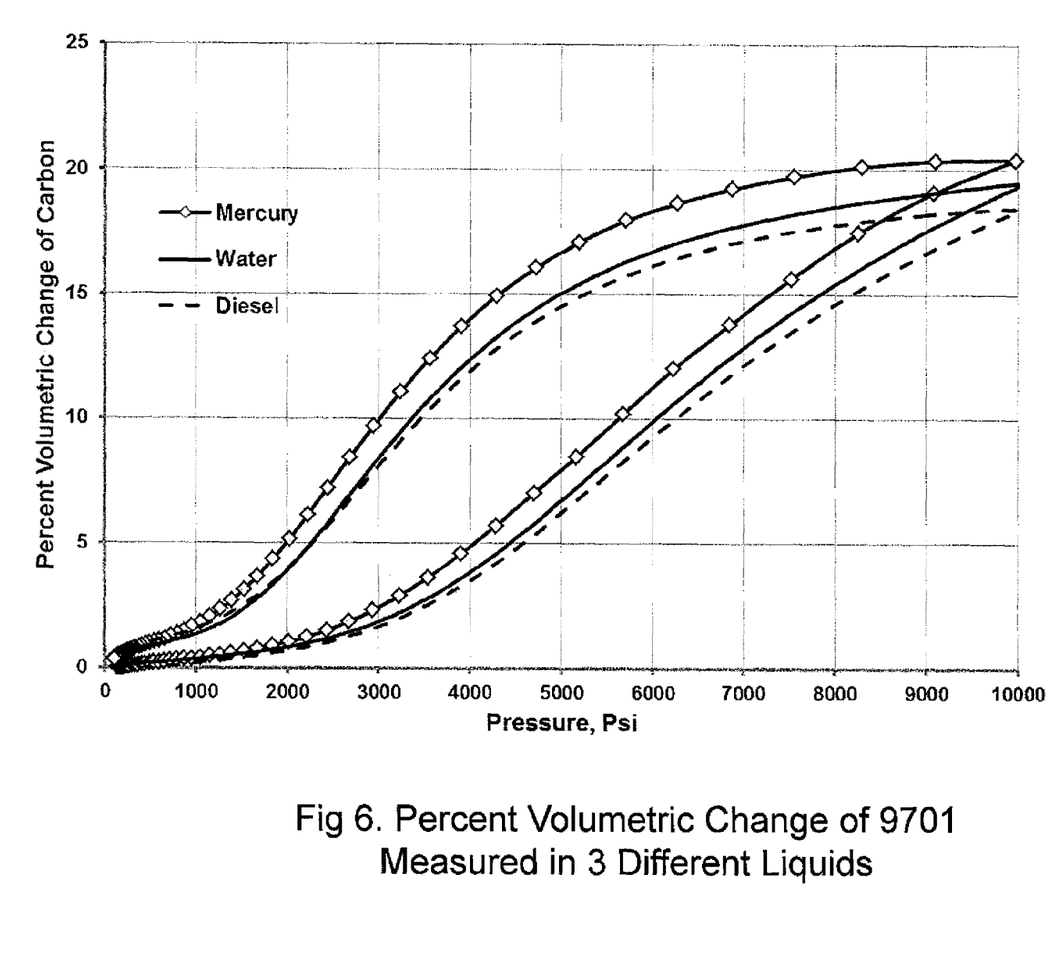
FIG. 6 is a graph of percent volumetric change of a carbonaceous material according to the present disclosure using a testing assembly as shown in FIG. 5 and using water, diesel fuel and mercury for the liquid media.

The carbonaceous material of the present disclosure is unique in that similar values for $V_R$ are obtained with using any of water, diesel and mercury for the fluid media, as shown in FIG. 6. These fluids have dramatically different wetting behaviors which, if the material had open pores, would be expected to result in widely different values for $V_R$ if the material had open pores. Thus, this also supports the conclusion that the material disclosed herein has fine closed porosity.

It will be understood that the description above is illustrative of some of the characteristics and principles of the present subject matter. Modifications and variations may be made by those skilled in the art without departing from the spirit and scope of the claimed subject matter, including those combinations of features that are individually disclosed or claimed herein. For these reasons, the scope of the present disclosure is not limited to the above description, but is as set forth in the following claims, and it is understood that claims may be directed to the features hereof, including as combinations of features that are individually disclosed or claimed herein.

The invention claimed is:

1. A porous carbon material characterized by having a reversible volumetric expansion/contraction in a fluid media, $V_R$, of ≥3% between 4,000 psi and 10,000 psi.

2. The porous carbon of claim 1 wherein the fluid media is selected from the group consisting of water, mercury and diesel fuel.

3. The porous carbon material of claim 1 further characterized by having a true density, $P_T$, of $1.2 \text{ g/cc} \leq P_T \leq 2.0 \text{ g/cc}$ when milled to −200 mesh and to a $d_{50}$ particle size of about 15 μm.

4. The porous carbon material of claim 1 further characterized by having a $d_{50}$ mean particle size of from 5 um to 8 mesh (2.38 mm).

5. The porous carbon material of claim 1 further characterized by having a degree of graphitization of ≤60%.

6. The porous carbon material of claim 1 further characterized by having a sulfur content of less than or equal to 8.0%.

7. A porous carbon material characterized by having a reversible volumetric expansion/contraction in a fluid media, $V_R$, of ≥3% between 4,000 psi and 10,000 psi; a $d_{50}$ particle size of 437 um and a true density $P_T$ of 1.49 g/cc when unmilled, and a $d_{50}$ particle size of 15.8 um and a true density $P_T$ of 1.67 g/cc after milling.

8. A method for mitigating annular pressure build up in a borehole having a casing and an annulus comprising adding a fluid including a porous carbon material in accordance with claim 1 to the annulus between the casing and the borehole.

\* \* \* \* \*